(12) United States Patent
Audet et al.

(10) Patent No.: US 10,423,751 B2
(45) Date of Patent: Sep. 24, 2019

(54) SEMICONDUCTOR PACKAGE FLOATING METAL CHECKS

(71) Applicant: International Business Machines Corporation, Armonk, NY (US)

(72) Inventors: Jean Audet, Granby (CA); Franklin M. Baez, Fishkill, NY (US); Jason L. Frankel, Wappingers Falls, NY (US); Paul R. Walling, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 50 days.

(21) Appl. No.: 15/719,698

(22) Filed: Sep. 29, 2017

(65) Prior Publication Data
US 2019/0102505 A1    Apr. 4, 2019

(51) Int. Cl.
*G06F 17/50* (2006.01)
(52) U.S. Cl.
CPC ...... *G06F 17/5081* (2013.01); *G06F 17/5072* (2013.01)
(58) Field of Classification Search
USPC ........................................................ 716/136
See application file for complete search history.

(56) References Cited

U.S. PATENT DOCUMENTS

| | | | |
|---|---|---|---|
| 5,441,915 A | 8/1995 | Lee | |
| 5,784,292 A | 6/1998 | Kumar | |
| 6,499,135 B1 | 12/2002 | Li et al. | |
| 6,735,749 B2 | 5/2004 | Li et al. | |
| 6,769,102 B2 | 7/2004 | Frank et al. | |
| 6,859,915 B1 | 2/2005 | Frank et al. | |
| 6,889,367 B1 | 5/2005 | Frank et al. | |
| 6,968,522 B1 | 11/2005 | Frank et al. | |
| 6,971,077 B1 | 11/2005 | Frank et al. | |
| 6,983,434 B1 | 1/2006 | Frank et al. | |
| 7,539,952 B2 | 5/2009 | Watanabe et al. | |
| 7,574,685 B1 | 8/2009 | Dong et al. | |
| 7,689,951 B2 | 3/2010 | Cazeaux | |

(Continued)

FOREIGN PATENT DOCUMENTS

CN    101866371 A    10/2010

OTHER PUBLICATIONS

List of IBM Patents or Patent Applications Treated as Related (Appendix P); Filed Sep. 29, 2017, 2 pages.

(Continued)

*Primary Examiner* — Bryce M Aisaka
(74) *Attorney, Agent, or Firm* — Cantor Colburn LLP; Steven Meyers

(57) ABSTRACT

Embodiments of the invention include methods, systems, and computer program products for checking floating metals in a laminate structure. Aspects of the invention include receiving, by a processor, floating metal rules and a semiconductor package design having a plurality of laminate layers. Each laminate layer includes a plurality of metal shapes, a plurality of signal lines, and a plurality of vias. The metal shapes, signal lines, and vias are mapped to one or more cells in an array. The processor determines, for each cell corresponding to a metal shape, whether the plurality of vias satisfies the floating metal rules. The processor can suggest new vias to satisfy the floating metal rules.

20 Claims, 8 Drawing Sheets

(56) References Cited

U.S. PATENT DOCUMENTS

| | | |
|---|---|---|
| 7,765,504 B2 | 7/2010 | Douriet et al. |
| 8,413,097 B2 | 4/2013 | Wu et al. |
| 8,468,482 B1 | 6/2013 | Pack et al. |
| 8,502,386 B2 | 8/2013 | Jiang et al. |
| 8,539,417 B2 | 9/2013 | Huels et al. |
| 8,762,899 B2 | 6/2014 | Lin et al. |
| 8,984,458 B2 | 3/2015 | Giffel |
| 9,099,353 B2 | 8/2015 | Bauch |
| 9,330,222 B2 | 5/2016 | White et al. |
| 9,495,498 B2 | 11/2016 | Bartley et al. |
| 9,519,732 B1 | 12/2016 | Gennari et al. |
| 10,133,841 B1 | 11/2018 | Majumder et al. |
| 2003/0196180 A1* | 10/2003 | Li ................... G06F 17/5022 716/112 |
| 2004/0015795 A1 | 1/2004 | Frank et al. |
| 2004/0015796 A1 | 1/2004 | Frank et al. |
| 2005/0076319 A1 | 4/2005 | Chow et al. |
| 2007/0283307 A1* | 12/2007 | Arizono ............ G06F 17/5068 716/52 |
| 2009/0020784 A1 | 1/2009 | Araki et al. |
| 2015/0026650 A1 | 1/2015 | Yeric |
| 2015/0213185 A1 | 7/2015 | Hensel et al. |
| 2016/0043137 A1* | 2/2016 | Lu ..................... H01L 27/2436 365/148 |
| 2016/0154924 A1 | 6/2016 | Ozawa |
| 2018/0089358 A1 | 3/2018 | Chobanyan et al. |

OTHER PUBLICATIONS

List of IBM Patents or Patent Applications Treated as Related (Appendix P); Date Filed Mar. 19, 2019, 2 pages.

Anson J. Call, et al. "Semiconductor Package Via Stack Checking," U.S. Appl. No. 15/719,693, filed Sep. 29, 2017.

Anson J. Call, et al. "Semiconductor Package Metal Shadowing Checks," U.S. Appl. No. 15/719,743, filed Sep. 29, 2017.

* cited by examiner

SEMICONDUCTOR PACKAGE FLOATING METAL CHECKS

BACKGROUND

The present invention generally relates to integrated circuit packaging and design, and more specifically, to methods, systems and computer program products for semiconductor package floating metal checks.

Electronic components include electronic devices, such as field programmable gate arrays (FPGAs), application specific integrated circuits (ASICs), and other integrated circuits, supported on a printed circuit board (PCB). These electronic devices are manufactured on semiconductor substrates by sequential processing operations. Multiple electronic devices can be manufactured on a single substrate. These multiple electronic devices on the single substrate are sliced into multiple dies (or chips) after the sequential processing operations are completed and all the devices are formed. Prior to being placed on the PCB, these electronic devices (or dies) are placed in packages to allow the devices to be handled and to be electrically coupled to the PCB. There are vias and interconnects (wires) embedded in multiple substrate layers in packages that provide an electrical network for the die to be electrically coupled to the PCB and to enable access to other devices.

An integrated circuit (IC) typically includes multiple packages interconnected in layers. Each package, in turn, may include multiple layers (also referred to as "planes"). Packages within a single IC may be composed of varying materials having varying electrical properties. Individual signal nets (also referred to herein simply as "nets") in the IC may be distributed across multiple packages.

Package design refers to the design of these packages (substrates). As with IC design more generally, various tools exist for automating aspects of package design. For example, design engineers typically use sophisticated Electronic Design Automation (EDA) tools to convert packaging method and process algorithms directly into circuit structures. Such tools typically provide a graphical user interface through which package designers can visually design the IC package in three dimensions.

SUMMARY

Embodiments of the present invention are directed to a computer-implemented method for checking floating metals in a laminate structure. A non-limiting example of the computer-implemented method includes receiving, by a processor, floating metal rules and a semiconductor package design having a plurality of laminate layers. Each laminate layer includes a plurality of metal shapes, a plurality of signal lines, and a plurality of vias. The metal shapes, signal lines, and vias are mapped to one or more cells in an array. The processor determines, for each cell corresponding to a metal shape, whether the plurality of vias satisfies the floating metal rules.

Embodiments of the present invention are directed to a system for checking floating metals in a laminate structure. A non-limiting example of the system includes a processor configured to receive floating metal rules. The processor also receives a semiconductor package design having a plurality of laminate layers. Each laminate layer includes a plurality of metal shapes, a plurality of signal lines, and a plurality of vias. The metal shapes, signal lines, and vias are mapped to one or more cells in an array. The processor determines, for each cell corresponding to a metal shape, whether the plurality of vias satisfies the floating metal rules.

Embodiments of the present invention are directed to a computer program product for checking floating metals in a laminate structure. A non-limiting example of the computer program product includes program instructions executable by a processor to cause the processor to receive floating metal rules. The processor also receives a semiconductor package design having a plurality of laminate layers. Each laminate layer includes a plurality of metal shapes, a plurality of signal lines, and a plurality of vias. The metal shapes, signal lines, and vias are mapped to one or more cells in an array. The processor determines, for each cell corresponding to a metal shape, whether the plurality of vias satisfies the floating metal rules.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
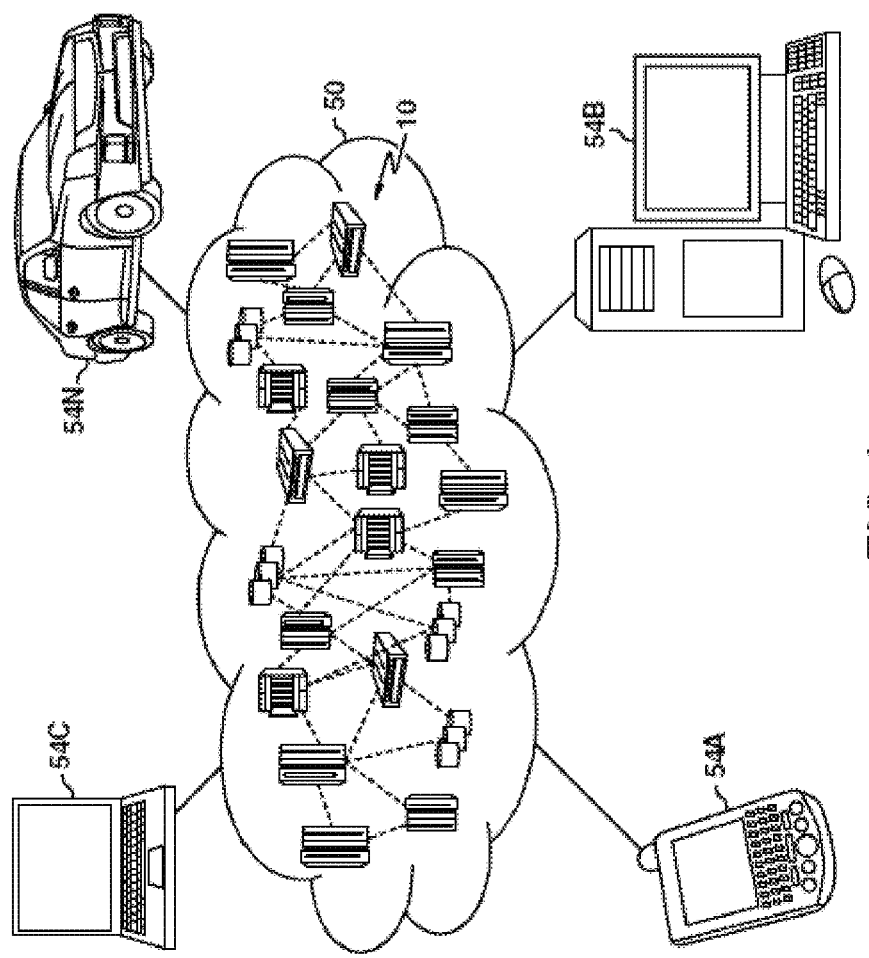
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
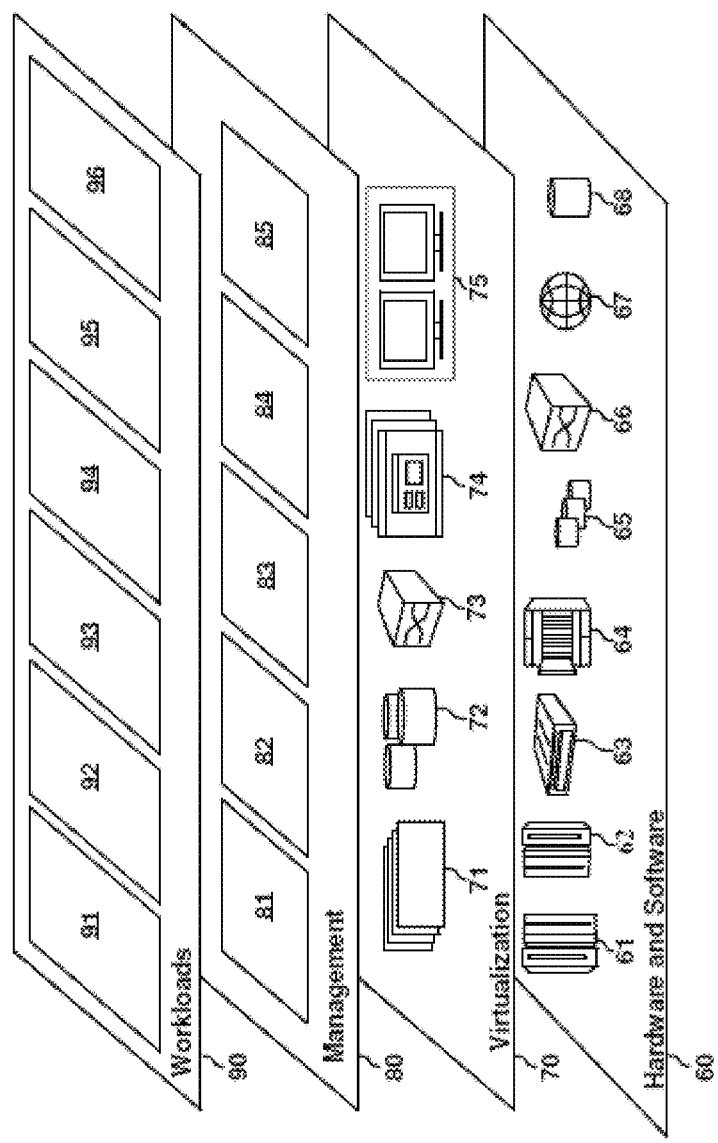
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and semiconductor package floating metal checks 96.

Figure 3:
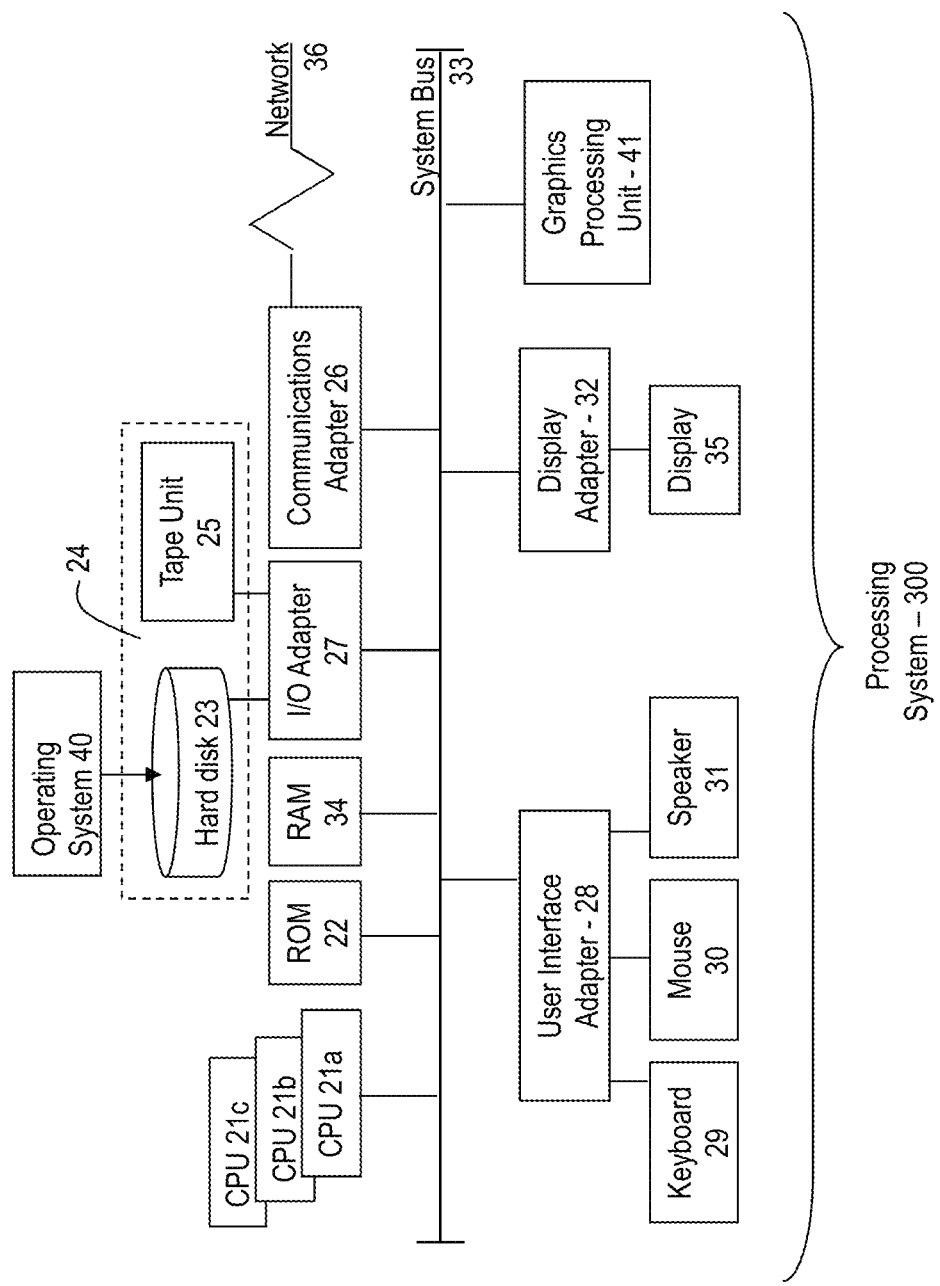
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the present invention, as previously noted herein, design engineers typically use sophisticated EDA tools to design IC packaging. Once a potential package is designed, package designers ensure that the package satisfies manufacturability and functionality requirements. Design Rule Checking or Check(s) (DRC) refers to an EDA determination as to whether a particular chip design satisfies a series of recommended parameters called Design Rules (also known as ground rules). The main objective of DRC is to achieve a high overall yield and reliability for the package design. If design rules are violated, the design may not be functional.

Currently available package design tools such as EDA with DRC are somewhat limited. For example, there exist package design rules that govern via tie downs in metal peninsulas and islands in a semiconductor package (also known as floating metal checks or design rules, or antenna condition checks). Floating metal design rules can define the maximum allowed distance between an edge or center portion of a metal peninsula or island and a tie down via. Metal peninsulas and islands that are not sufficiently tied down with vias are rejected. Conventional EDA tools with DRC capability cannot automatically check a package design that includes metal peninsulas and islands having an irregular polygon shape. Instead, conventional tools are limited to checking substantially rectangular metal shapes. As a result, a human package designer must typically manually verify that the available tie down vias in a given package design satisfy the floating metal design rules. This is a tedious, time-consuming, and error-prone process.

Turning now to an overview of the aspects of the invention, one or more embodiments of the invention address the above-described shortcomings of the prior art by providing methods, systems, and computer program products for semiconductor package floating metal checks. Aspects of the invention serve to optimize the verification of tie down vias within a semiconductor package design to greatly improve package verification efficiency and to reduce the errors associated with the manual checking of metal peninsulas and islands.

Aspects of the invention include receiving floating metal rules and a semiconductor package design. The floating metal rules include, for example, maximum allowed via-via distances and via-edge distances in a metal floating island or peninsula. The package design includes one or more laminate layers as well as various signal lines, metal shapes, and vias distributed on each of the laminate layers. Each metal shape, signal line, and via located on a given laminate layer is mapped to one or more cells in a two-dimensional array. Each cell of the two-dimensional array includes a 32 digit binary number and each digit in the 32 digit binary number corresponds to a unique location (i.e., vertical and horizontal coordinates) on the laminate layer. Advantageously, the presence, or absence, of a metal shape, signal line, or via at a particular location on a laminate layer can be easily verified by (1) reading the cell corresponding to the location (i.e., matching the vertical coordinates) and (2) reading the value of the binary digit in that cell that maps to the location (i.e., matching the horizontal coordinates).

Aspects of the invention include determining, for each pixel corresponding to a metal shape, whether the plurality of currently available design vias satisfies the floating metal rules (for example, whether a design via is within a given radius of a pixel). Advantageously, if a pixel within a metal shape fails the floating metal rules the laminate layers immediately above and/or below the pixel are automatically searched to determine suitable locations for a new tie down via(s) that would satisfy the floating metal rules. In this manner, a simplified, automatic process is provided for semiconductor package floating metal checks.

The above-described aspects of the invention address the shortcomings of the prior art by providing a package design tool that can automatically check a laminate layer having metal peninsulas and islands with arbitrary shapes for sufficient via tie downs. In other words, the package design tool is capable of simultaneously handling various metal peninsula and island shapes including irregular polygons. An error is automatically reported for all metal peninsulas and islands which do not have sufficient via coverage. The package design tool is further able to search adjacent laminate layers for locations which are suitable for spanning a new via to fix the error.

Figure 4:
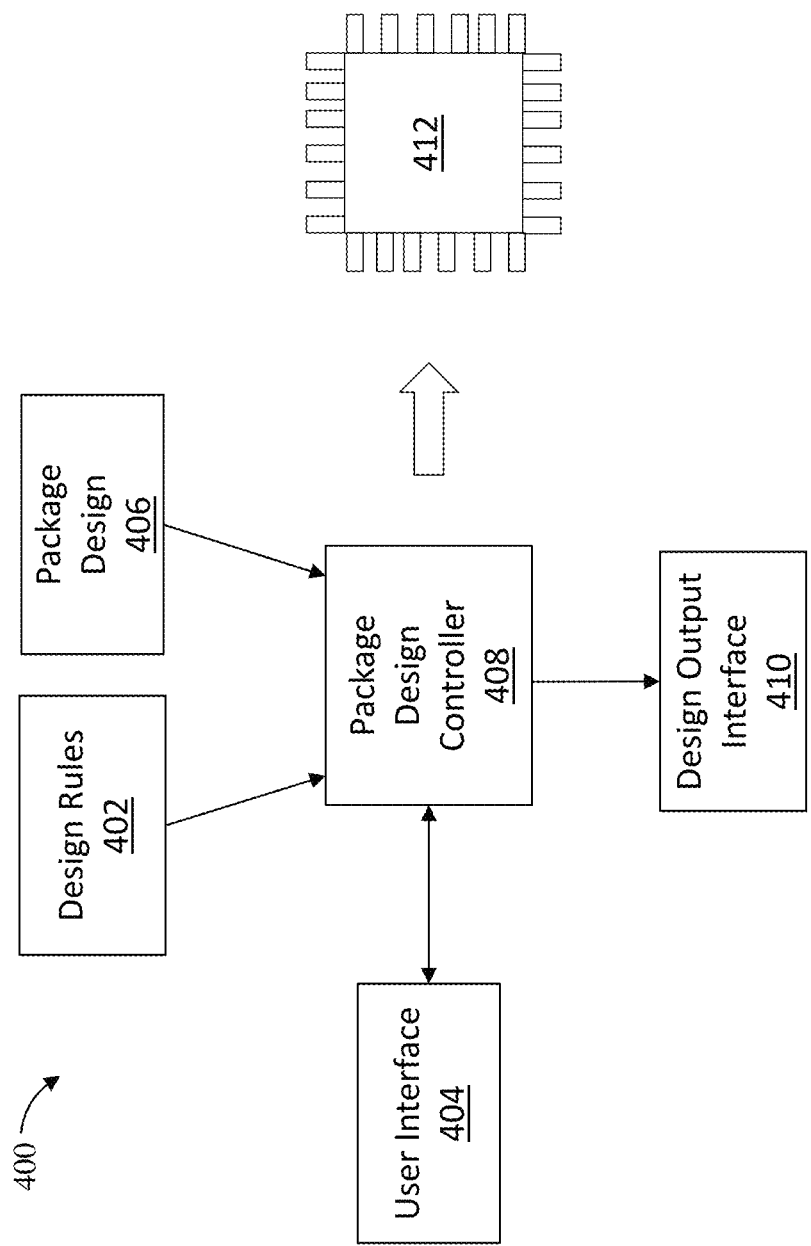
FIG. 4 depicts a block diagram of a system for semiconductor package floating metal checks according to one or more embodiments of the present invention.

Turning now to a more detailed description of aspects of the present invention, FIG. 4 depicts a system 400 for designing and checking semiconductor package floating metals and the resulting physical implementation of a semiconductor package 412 according to one or more embodiments of the present invention. The system 400 includes a design rules database 402, a user interface 404, a package design database 406, a package design controller 408, and a design output interface 410. In one or more embodiments of the invention, the package design controller 408 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein. In some embodiments of the present invention, the package design controller 408 is used to physically implement a semiconductor package or integrated circuit that satisfies the design rules 402 and the system 400 includes the resulting physical implementation of the semiconductor package 412. Once the semiconductor package 412 has been designed or otherwise modified to satisfy the design rules 402, the semiconductor package 412 can be physically implemented using known semiconductor package or integrated circuit fabrication techniques.

In one or more embodiments of the invention, the package design controller 408 is configured to receive design rules from the design rules database 402, a package design from the package design database 406, and a package designer's (user's) input from the user interface 404. In some embodiments of the present invention, a user can input additional or custom design rules into the package design controller 408 which can supplement or replace the design rules stored in the design rules database 402. The package design can be loaded from the package design database 406 or provided by the user using the user interface 404. In some embodiments of the present invention, the user can build up a new package design using the user interface 404.

The package design includes a description of all of the features of a particular package. In some embodiments of the present invention, the package design includes a list of all package layers, the dimensions of each layer, the location and dimensions of all chips within the package, the location and dimensions of all signal lines within the package, the location and dimensions of all metal shapes within the package, the coordinates of all via stacks within the package, and, for each via stack, the starting and ending layer of the via stack, the diameter of the via stack at each layer, and a unique identifier for each via stack. It is understood that these parameters are exemplary and that a package design can include additional or different elements.

The design rules include floating metal design rules or constraints for metal peninsulas and islands in a semiconductor package or PCB. For example, a first design rule can define a maximum via-via distance in any metal shape (known as an internal floating metal check). A second design rule can define a maximum edge-via distance in any metal shape (known as an external floating metal check). It is understood that these design rules are merely exemplary and that other design rules having various complexities are possible.

The package design controller 408 receives the design rules from the design rules database 402 and/or the user interface 404 and the package design from the package design database 406 and/or the user interface 404. The package design controller 408 then checks the design rules against the package design using a floating metal checking process according to one or more embodiments of the present invention.

Figure 5:
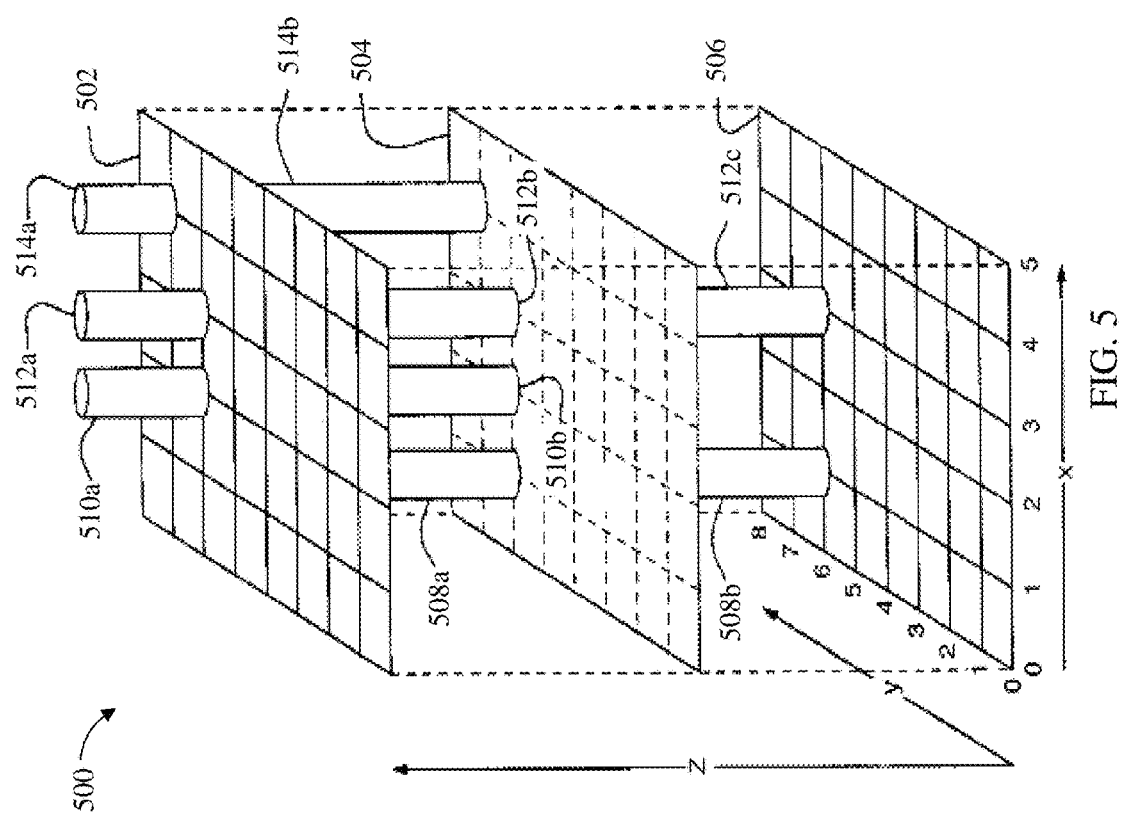
FIG. 5 depicts an illustrative example of a package design according to one or more embodiments of the present invention.
Figure 6:
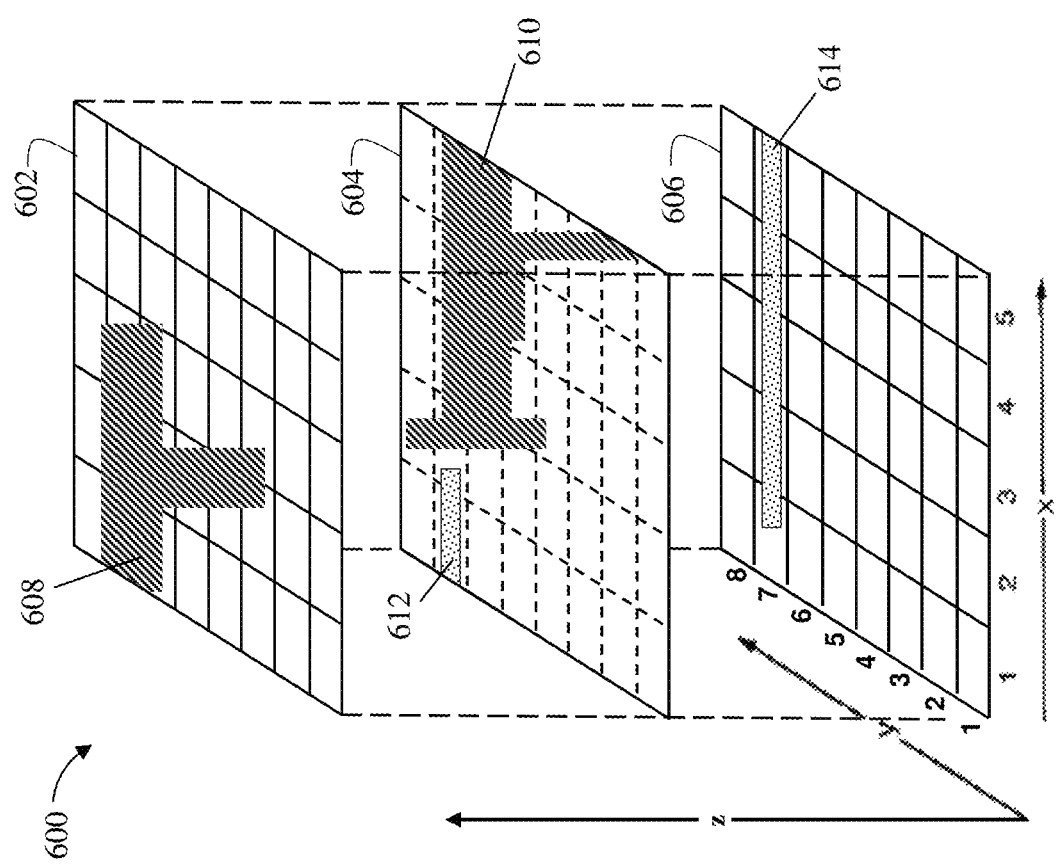
FIG. 6 depicts an illustrative example of a package design according to one or more embodiments of the present invention.

In some embodiments of the present invention, the package design controller 408 maps all of the vias, signal lines, and metal shapes (i.e., floating islands and peninsulas) in the package design to a three-dimensional (3-D) array. In some embodiments of the present invention, the package design controller 408 maps all of the vias to a first 3-D array and all of the signal lines and metal shapes to a second 3-D array. An exemplary package design for generating a 3-D via array is depicted in FIG. 5. An exemplary package design for generating a 3-D signal line and metal shape array is depicted in FIG. 6.

To generate a 3-D array, the package design controller 408 compresses each individual laminate layer of the package design into a two-dimensional (2-D) array (i.e., an x-y coordinate map) and a compressed cross-sectional map (i.e., a z-coordinate map) of the laminate stack is generated by assigning the integers 0-N to the n layers of the package design. In this manner, each laminate layer of the package design (i.e., each 2-D array corresponding to a laminate layer) can be incorporated into a single 3-D array. In some embodiments of the present invention, the topmost layer is assigned "0" and the bottommost layer (i.e., the $n^{th}$ layer) is assigned "N."

To generate the 2-D array for each laminate layer, a coordinate system having an origin (0,0) located at, for example, the bottom left corner of each of the laminate layers is used to provide a reference frame. In some embodiments of the present invention, an arbitrary pixel size (i.e., resolution) can be provided by a user or a default size can be provided by the package design controller 408. For example, a 64 micron by 64 micron package layer can be mapped into a 2-D array of 2 micron by 2 micron pixels. In some embodiments of the present invention, each cell of the 2-D array includes a 32 digit binary number (described herein as a 32-bit number). The value of each digit of each of the 32-bit numbers corresponds to a single "pixel" in a laminate layer with respect to the coordinate system. In this manner, the 2-D array includes a unique binary value for each 2 micron by 2 micron pixel of the package design.

Continuing the previous example, a 64 micron by 64 micron package layer can be mapped into a 2-D array having 32 cells, each cell holding a 32-bit number. It is understood that these parameters are exemplary and that any package design having any dimensions (i.e., 100 mm by 100 mm, 32 microns by 32 microns, etc.) can be similarly compressed into a grid of pixels. Moreover, it is understood that the size of these pixels can be adjusted to increase or decrease the accuracy of the mapping (i.e., 1 micron by 1 micron pixels can be used to increase accuracy while 5 micron by 5 micron pixels can be used to decrease accuracy). Further, it is not necessary that the layers or pixels be perfectly square (i.e., a 100 mm by 60 mm layer can be mapped into 5 micron by 3 micron pixels). Accordingly, vias, signal lines, and metal shapes can then be mapped into a 3-D array(s) having a defined pixel resolution.

To generate a 3-D via array, the package design controller 408 generates compressed via mappings for each laminate layer. First, the package design controller 408 creates compressed x and y coordinate maps for the physical locations of all of the via stacks in a particular laminate layer. For example, a via stack located at (10.23, 11.2) can be defined having an x coordinate of 10.23 microns from the left edge of the layer and a y coordinate of 11.2 microns from the bottom edge of the layer. The package design controller 408 sorts the x coordinates of every via stack in the laminate layer and creates a compressed x map by assigning the sorted x coordinates to the integers 0-N. Similarly, the package design controller 408 sorts the y coordinates of every via stack in the laminate layer and creates a compressed y map by assigning the sorted y coordinates to the integers 0-N. For example, a via stack located at (10.23, 11.2) can be assigned a value of "41" in the compressed x map and a value of "23" in the compressed y map indicating that the via stack is located in the $41^{st}$ unique sorted x location and the $23^{rd}$ unique sorted y location. These compressed x and y mappings provide the technical benefit of enabling a bit shift sorting process as described in more detail herein.

In some embodiments of the present invention, the package design controller 408 generates a via identifier map in addition to the x and y mappings. The via identifier map is created by assigning the integers 0-N to each of the via portions of the package design by mapping each unique integer to a unique via string (a via definition). In some embodiments of the present invention, the via identifier map is a 32 value mapping having values 0-31 (i.e., 32 unique via identifiers are available). 64 value mappings and even higher value mappings are available but are not typically required as conventional package designs include less than 32 unique via definitions. Each via string includes, at a minimum, an identifier for each of the laminate layers that are electrically coupled by the via portion as well as a unique via name and the diameter of the via at each layer. For example, a via string "FV2, FC3, FC2, 1.1, 1.2" is generated for a via stack portion labeled FV2 that electrically couples the FC3 and FC2 layers. The diameter of FV2 on the FC3 layer is 1.1 and the diameter of FV2 on the FC2 layer is 1.2. It is understood that this via string is exemplary and that the via strings can include different or additional details as desired.

In some embodiments of the present invention, the package design controller 408 then maps all of the compressed via coordinates (i.e., x, y, and z locations of each via compressed as described above) to one or more cells in a 3-D array. In some embodiments of the present invention, such as those having a 32 value via identifier mapping, the 3-D array includes a 3-D array of 32 digit binary numbers (described herein as 32-bit numbers). In this manner, the 3-D array includes a unique 32-bit value for each x, y, and z coordinate stored in the compressed x, y, and z mappings. The value of each of the 32-bit numbers corresponds to the list of unique via definitions which are present at the compressed coordinates associated with that respective 32-bit number. For example, assume a top-FC3 via and an FC3-FC2 via are located at (10.23, 6.89). The top-FC3 via is the $2^{nd}$ sorted via definition and the FC3-FC2 via is the $4^{th}$ sorted via definition in the via identifier map. The top layer has a z position of "0", 10.23 is the $41^{st}$ unique sorted x value, and 6.89 is the $23^{rd}$ unique sorted y value. Under these assumptions, the 32-bit number located at (41, 23, 0) will equal 00000 . . . 01010 indicating that the $2^{nd}$ and $4^{th}$ via definitions are present at the compressed coordinates (41, 23) on the top layer "0." In other words, a "1" at the $n^{th}$ digit reading from the right indicates that the $n^{th}$ via definition is present at that compressed coordinate. This 3-D array can be generated using any suitable means.

In some embodiments of the present invention, values in the 3-D array are exhaustively generated for each via definition using a bit shifting algorithm. For example, the 32-bit value at (41, 23, 0) starts at zero (i.e., 00000 . . . 00000). The top-FC3 via is inserted into the 32-bit value by bit shifting the value "1" a single time (i.e., 00000 . . . 00010) and using the OR operator on the original value (i.e., 00000 . . . 00000). The result is a 32-bit value of 0000 . . . 00010. The FC3-FC2 via definition is inserted into this 32-bit value by bit shifting "1" three times (i.e., 00000 . . . 01000) and using the OR operator on the new value (i.e., 00000 . . . 00010). The result is a 32-bit value equal to 00000 . . . 01010 stored at (41, 23, 0) in the 3-D array.

Generating the compressed 3-D via array advantageously allows the package design controller 408 to easily analyze the extent (i.e., 2-high, 3-high) and placement (i.e., spanning layer n to layer m) of each via stack in the package design. In some embodiments of the present invention, the package design controller 408 exhaustively checks each via definition in the via identifier map against the 3-D array. For example, the $2^{nd}$ via definition corresponding to the top-FC3 via is first located by reading through all of the 32-bit values in the 3-D array and identifying those 32-bit values having a "1" in the $2^{nd}$ digit when read from the right. In some embodiments of the present invention, these bits are identified using a bit shifting algorithm. To locate all occurrences of the $2^{nd}$ via definition, for example, the value 00000 . . . 00010 is compared using the AND operator to the 32-bit values stored in the 3-D array. Continuing the previous example, the value 00000 . . . 01010 stored at (41, 23, 0) would yield a value of 00000 . . . 00010 after the AND operation, indicating that the $2^{nd}$ via definition is present at this location.

Once the via definition is located in a 32-bit value of the 3-D array, the package design controller 408 looks through the 32-bit value to identify all other via definitions present at these compressed coordinates (i.e., all of the exactly coincident vias) or at sufficiently nearby coordinates (i.e., all of the staggered vias). Continuing the previous example, the package design controller 408 will identify the $4^{th}$ via definition corresponding to the FC3-FC2 via also located at (10.23, 6.89). The package design controller 408 checks the via identifier map layer data to see if any of the other via definitions stored in this 32-bit value abut the current via definition (i.e. the top layer of one via definition is the bottom layer of the other).

One advantage of the present invention is the availability of a user defined stagger distance. If a user defined stagger distance is provided the package design controller 408 will look for staggered via definitions in addition to the exactly coincident via definitions already captured. In other words, if the $2^{nd}$ via definition is located at (41, 23, 0) in the 3-D array the package design controller 408 will also check the adjacent 32-bit values at layers above and below the coordinates of the current via definition (i.e., those having compressed values±1 or 2 from the current value). For example, the 32-bit values at (41, 22, 1) and (42, 23, 1) can be checked for staggered via definitions for the current via definition (41, 23, 0). The actual uncompressed location and diameter of these adjacent via definitions is compared against the uncompressed location and diameter of the current via definition to generate centerline-to-centerline distances. A staggered via definition is then identified by comparing this centerline-to-centerline distance against the allowed stagger value. The adjacent via definition is added to the current via stack if the actual centerline-to-centerline distance is within the allowed stagger distance. In this manner, the package design controller 408 builds up a more complete via stack including both exactly coincident and staggered vias.

To generate a 3-D signal line and metal shape array, the package design controller 408 maps all of the signal lines and metal shapes for each laminate layer of the package design into one or more cells in a 2-D array. In some embodiments of the present invention, the signal lines and metal shapes on each laminate layer are mapped into separate 2-D arrays. These 2-D arrays are then combined into a single 3-D array according to one or more embodiments of the present invention. For a 2 micron by 2 micron pixel size, for example, the package design controller 408 fills each 2-D array with signal lines and/or metal shapes rounded to 2-micron intervals by exhaustively setting the value of all binary digits in each of the cells in the array to "0" or "1," where "1" indicates the presence of a signal line and/or metal shape in the corresponding pixel.

Any suitable scanline process can be used by the package design controller 408 to identify the metal shapes and signal lines for mapping into the arrays. In some embodiments of the present invention, the package design controller 408 receives a text-based list of all shapes, edges, lines, circles, and arcs in the package design. Assuming horizontal scanlines, horizontal lines edges can be ignored. Similarly, vertical edges can be ignored for vertical scanlines. The package design controller 408 can determine if a given pixel is within a particular shape by taking the vertical position (y value) of the pixel and scanning across (for all x values less than the x value of the pixel) the package layer for x intercepts having an edge. In some embodiments of the present invention, the package design controller 408 keeps track of the x intercepts having an edge and calculates the total number of x intercepts having an edge for a given pixel. The pixel is inside a shape if the number of these intercepts mod 2 is equal to 1.

Once all of the vias, signal lines, and metal shapes in the package design are mapped to one or more 3-D arrays, the package design controller 408 compares the mapped metal shapes against the mapped vias for compliance with the floating metal design rules. In some embodiments of the present invention, the package design controller 408 scans each mapped laminate layer along a user-defined interval, or alternatively, by a default interval stored in the package design controller 408. For example, an interval of 6 microns can be set for a 3-D array having 2 micron by 2 micron pixels to effectively skip over some of the pixels. In some embodiments of the present invention, the interval distance is a function of the pixel size, feature widths (i.e., via widths, signal line widths, etc.), and/or available processing time or speed.

In some embodiments of the present invention, the package design controller 408 checks each pixel indicating a metal shape (i.e., each pixel corresponding to a value of "1" in the metal shape array) against the corresponding location in the via array for compliance with the floating metal design rules. If a via is found in the corresponding location on the laminate layer, the package design controller 408 indicates that the floating metal rule is satisfied and the next portion of the laminate layer is checked at the defined interval distance.

If no via is found in the corresponding location on the laminate layer, the package design controller 408 searches the via array for all vias within a defined radius of the current pixel. In some embodiments of the present invention, this radius is the maximum via-via or edge-via distance allowed by the floating metal rules.

If no vias are found within the defined radius, the package design controller 408 determines whether the error is an internal or external floating metal rule error. An internal floating metal rule error is reported if the current metal shape completely covers all of the pixels within the defined radius. Conversely, an external floating metal rule error is reported if the current metal shape only partially covers all of the pixels within the defined radius or if an edge is found within the defined radius.

If one or more vias are found within the defined radius, the package design controller 408 determines whether at least one of the vias is coupled to the metal shape. In some embodiments of the present invention, the package design controller 408 confirms via-metal shape connectivity by determining if a connected path is available between the via and the metal shape using the Dijkstra shortest-path algorithm. If a connected path between the via and the metal shape is not available, or if the distance along the Dijkstra shortest-path is longer than the error distance (i.e., the maximum allowable distance as defined in the floating metal design rules), the package design controller 408 reports an internal or external error as appropriate. Conversely, if a connected path having a length less than the error distance exists between the via and the metal shape, the package design controller 408 indicates that the floating metal rule is satisfied and the next portion of the laminate layer is checked at the defined interval distance.

In some embodiments of the present invention, the package design controller 408 suggests locations for one or more new vias that address one or more reported errors. For example, for each reported error on a particular laminate layer, the package design controller 408 can search the adjacent laminate layers for locations which are suitable for spanning a new via to fix the error. In some embodiments of the present invention, the package design controller 408 locates a pixel on a laminate layer immediately above or below the current pixel and determines whether a via can be legally placed within a defined distance. In some embodiments of the present invention, the floating metal design rules include a minimum via radius and/or buffer distances between a via and other features (i.e., another via, a signal line, an edge of a metal shape, etc.) on the laminate. If a legal via can be placed within the defined via radius and/or buffer distance, the package design controller 408 will list the potential via as an optional fix to the reported error.

FIG. 5 depicts an illustrative example of a package design 500 for generating a 3-D via array according to one or more embodiments of the invention. The package design 500 can be input into the package design controller 408 described herein for semiconductor package via stack checking. In some embodiments of the present invention, the package design 500 includes layers 502, 504, and 506 vertically stacked in a direction z. These layers are merely illustrative and additional layers can be provided above and below those depicted. Moreover, the package design 500 is depicted with condensed x-y coordinates for ease of illustration. It is understood that the full size package design 500 includes the true, uncompressed coordinates for each via stack. These coordinates are then condensed into various mappings according to one or more embodiments of the invention and as described with respect to FIG. 4.

Via stacks 508, 510, 512, and 514 are distributed throughout the layers 502, 504, and 506 along the directions x and y. As depicted, via stack 508 includes a portion 508a that electrically couples layer 502 to layer 504 and a portion 508b that electrically couples layer 504 to layer 506 (i.e., via stack 508 is a "2-high" via stack). Similarly, via stack 510 having portions 510a and 510b and via stack 514 having portions 514a and 514b are 2-high via stacks. Via stack 512 includes a portion 512a that electrically couples a topmost layer (not depicted) to layer 502, a portion 512b that electrically couples layer 502 to layer 504, and a portion 512c that electrically couples layer 504 to layer 506 (i.e., via stack 512 is a "3-high" via stack). These via stacks are merely illustrative and the package design 500 can include single layer vias, 4-high via stacks, 5-high via stacks, and via stacks having any number of subsections (i.e., x-high via stacks). As discussed previously herein, portions of a via stack can be exactly coincident or can be offset by a stagger. It is understood that the package design 500 overall is merely exemplary and that other, more complicated package designs having a plurality of additional layers, via stacks, and chips (not illustrated) are contemplated.

FIG. 6 depicts an illustrative example of a package design 600 for generating a 3-D signal line and metal shape array according to one or more embodiments of the invention. The package design 600 can be input into the package design controller 408 described herein for semiconductor package floating metal checks. In some embodiments of the present invention, the package design 600 includes layers 602, 604, and 606 vertically stacked in a direction z. These layers are merely illustrative and additional layers can be provided above and below those depicted. Moreover, the package design 600 is depicted with condensed x-y coordinates for each pixel for ease of illustration. It is understood that the full size package design 600 includes the true, uncompressed location and dimensions for each signal line and power shape and that each pixel corresponds to an actual physical location according to one or more embodiments of the present invention.

As depicted, power shape 608 is distributed throughout the layer 602. Similarly, power shape 610 is distributed throughout the layer 604. A signal line 612 partially traverses the layer 604 and a signal line 614 partially traverses the layer 606. These power shapes and signal lines are merely illustrative. The package design 600 can include different or additional power shapes and signal lines. It is understood that the package design 600 overall is merely exemplary and that other, more complicated package designs having a plurality of additional layers, power shapes, signal lines, and chips (not illustrated) are contemplated.

Figure 7:
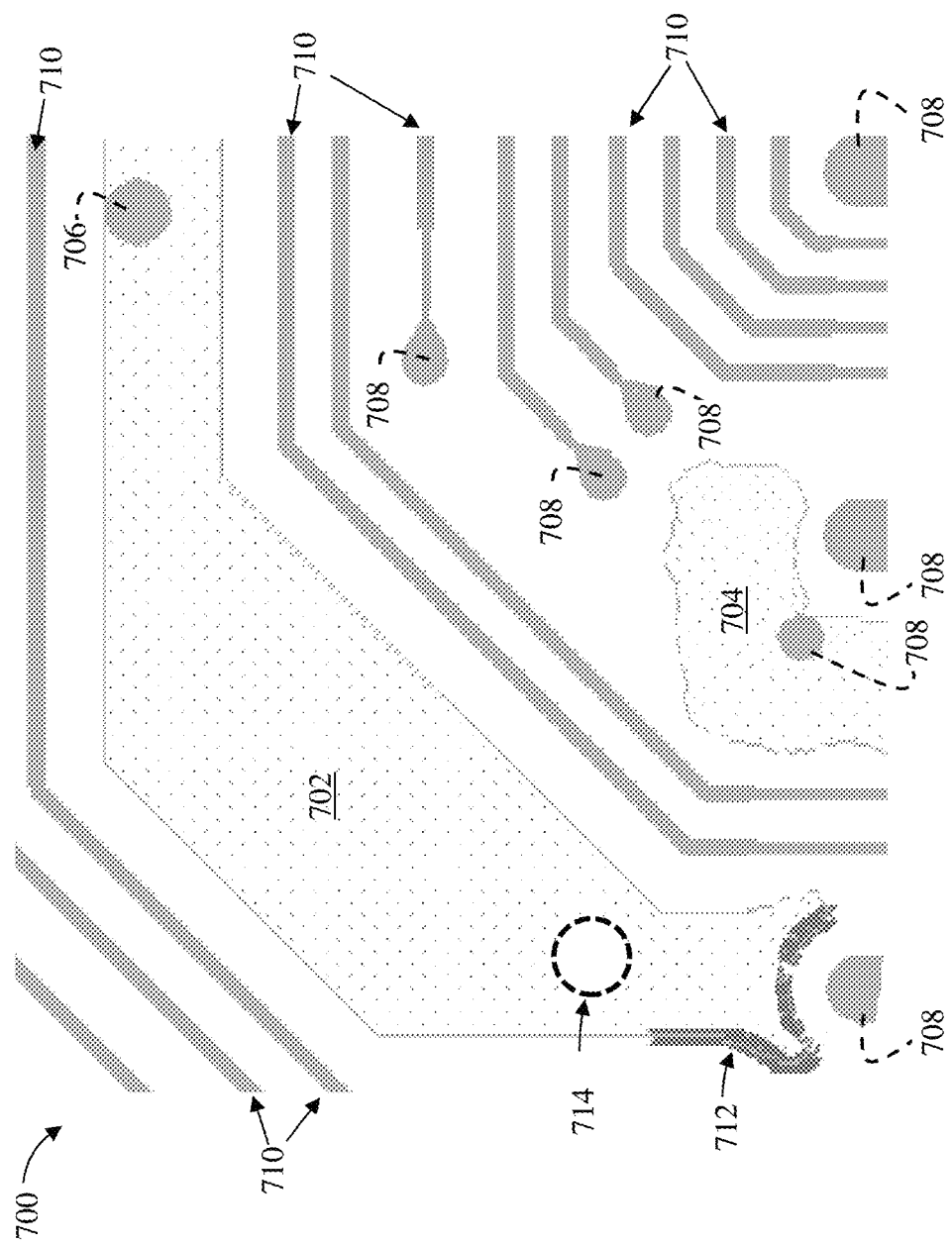
FIG. 7 depicts an illustrative laminate layer according to one or more embodiments of the invention.

FIG. 7 depicts an illustrative laminate layer 700 according to one or more embodiments of the invention. Metal shapes 702 and 704 are distributed throughout the laminate layer 700. A via 706 is within a portion of the metal shape 702. Various vias 708 are outside of the metal shape 702. Various signal lines 710 partially traverse the laminate layer 700. An edge error 712 is reported for a portion of the metal shape 702. For example, the edge error 712 can be reported for each pixel of the metal shape 702 which fails the shortest-path requirements of the floating metal design rules according to one or more embodiments of the present invention. A new via 714 can be suggested for eliminating the error according to one or more embodiments of the present invention.

Figure 8:
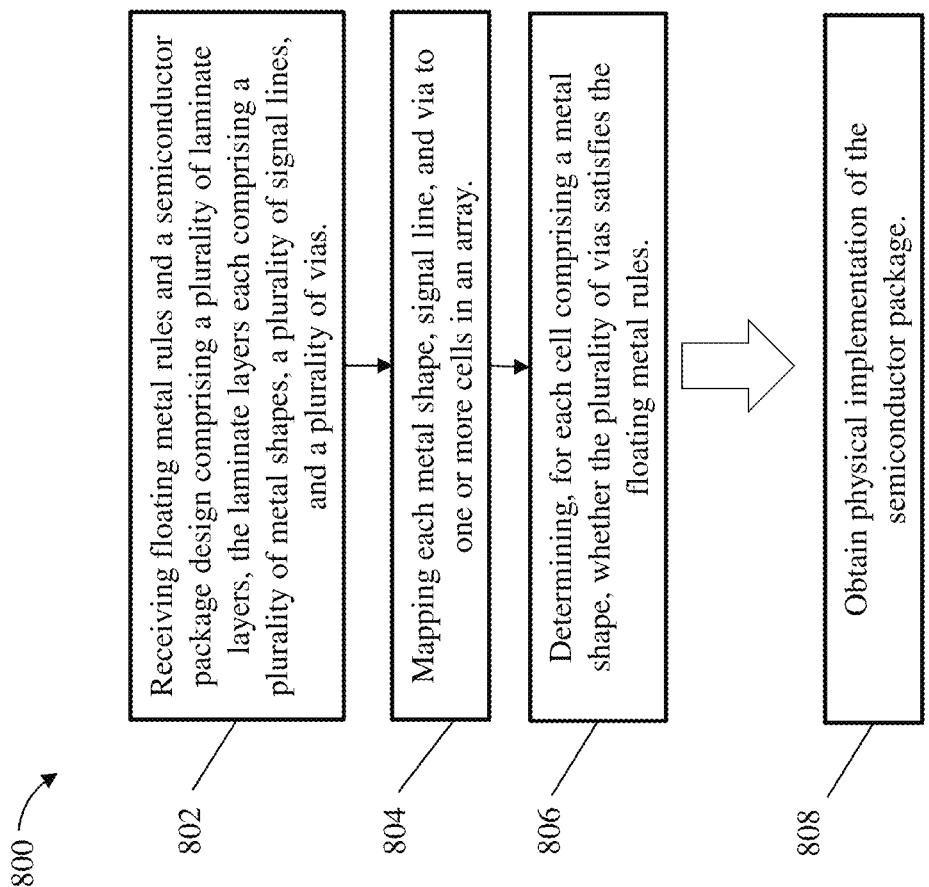
FIG. 8 depicts a flow diagram of a method for semiconductor package floating metal checks according to one or more embodiments of the invention.

FIG. 8 depicts a flow diagram of a method for semiconductor package floating metal checks according to one or more embodiments of the invention. The method 800 includes receiving, at block 802, floating metal rules and a semiconductor package design having a plurality of laminate layers according to one or more embodiments. Each laminate layer includes a plurality of metal shapes, a plurality of signal lines, and a plurality of vias. At block 804, the method 800 includes mapping each metal shape, signal line, and via to one or more cells in an array according to one or more embodiments. The method 800, at block 806, includes determining, for each cell corresponding to a metal shape, whether the plurality of vias satisfies the floating metal rules according to one or more embodiments. As discussed previously herein, the semiconductor package design can be designed or modified to satisfy the floating metal rules. Subsequently, obtaining the physical implementation of a semiconductor package which satisfies the floating metal rules is performed at block 808.

Additional processes may also be included. It should be understood that the processes depicted in FIG. 8 represent illustrations and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for checking floating metals in a laminate structure, the method comprising:
   receiving, by a processor, floating metal rules and a semiconductor package design comprising a plurality of laminate layers, the laminate layers each comprising a plurality of metal shapes, a plurality of signal lines, and a plurality of vias;
   mapping each of the plurality of metal shapes, the plurality of signal lines, and the plurality of vias to one or more cells in an array, wherein each cell in the array comprises a number and each digit in the number corresponds to a unique location on a laminate layer in the semiconductor package design; and
   determining, for each of the one or more cells comprising at least one of the plurality of metal shapes, whether the plurality of vias satisfies the floating metal rules.

2. The method of claim 1 further comprising displaying on a user interface a list of metal shapes that did not satisfy the floating metal rules.

3. The method of claim 1 further comprising suggesting, for each metal shape of the plurality of metal shapes that did not satisfy the floating metal rules, one or more new vias that would satisfy the floating metal rules.

4. The method of claim 1, wherein each cell in the array comprises a 32 digit binary number.

5. The method of claim 4, wherein each unique location is a two micron by two micron pixel.

6. The method of claim 5, wherein mapping each of the plurality of metal shapes to one or more cells in the array comprises setting a value of all binary digits in each of the cells in the array to 0 or 1, wherein a value of 1 indicates a presence of a metal shape.

7. The method of claim 5 further comprising determining, for a pixel comprising a first metal shape of the plurality of metal shapes, whether one or more vias of the plurality of vias exists within a radius of the pixel.

8. The method of claim 7 further comprising determining, for a first via within the radius of the pixel, whether a connected path exists between the first via and the first metal shape.

9. The method of claim 8, wherein the connected path is generated using a Dijkstra shortest-path algorithm.

10. A system for checking floating metals in a laminate structure, the system having a processor coupled to a memory, the processor configured to:
    receive floating metal rules and a semiconductor package design comprising a plurality of laminate layers, the laminate layers each comprising a plurality of metal shapes, a plurality of signal lines, and a plurality of vias;
    map each of the plurality of metal shapes, the plurality of signal lines, and the plurality of vias to one or more cells in an array, wherein each cell in the array comprises a number and each digit in the number corresponds to a unique location on a laminate layer in the semiconductor package design; and
    determine, for each of the one or more cells comprising at least one of the plurality of metal shapes, whether the plurality of vias satisfies the floating metal rules.

11. The system of claim 10, wherein each cell in the array comprises a 32 digit binary number.

12. The system of claim 11, wherein each unique location is a two micron by two micron pixel.

13. The system of claim 12 further comprising determining, for a pixel comprising a first metal shape of the plurality of metal shapes, whether one or more vias of the plurality of vias exists within a radius of the pixel.

14. The system of claim 13 further comprising determining, for a first via within the radius of the pixel, whether a connected path exists between the first via and the first metal shape.

15. The system of claim 14, wherein the connected path is generated using a Dijkstra shortest-path algorithm.

16. A computer program product for checking floating metals in a laminate structure, the computer program product comprising a computer readable storage medium having program instructions embodied therewith, the program instructions executable by a processor to cause the processor to:
    receive floating metal rules and a semiconductor package design comprising a plurality of laminate layers, the laminate layers each comprising a plurality of metal shapes, a plurality of signal lines, and a plurality of vias;
    map each of the plurality of metal shapes, the plurality of signal lines, and the plurality of vias to one or more cells in an array, wherein each cell in the array comprises a number and each digit in the number corresponds to a unique location on a laminate layer in the semiconductor package design; and
    determine, for each of the one or more cells comprising at least one of the plurality of metal shapes, whether the plurality of vias satisfies the floating metal rules.

17. The computer program product of claim 16 further comprising displaying on a user interface a list of metal shapes that did not satisfy the floating metal rules.

18. The computer program product of claim 16 further comprising suggesting, for each metal shape of the plurality of metal shapes that did not satisfy the floating metal rules, one or more new vias that would satisfy the floating metal rules.

19. The computer program product of claim 16, wherein each cell in the array comprises a 32 digit binary number.

20. The computer program product of claim 19, wherein each unique location is a two micron by two micron pixel.

\* \* \* \* \*